United States Patent
Ciaccio et al.

(10) Patent No.: US 10,392,467 B2
(45) Date of Patent: Aug. 27, 2019

(54) COATINGS COMPRISING BRANCHED POLYESTER-URETHANE RESINS

(71) Applicant: PPG Industries Ohio, Inc., Cleveland, OH (US)

(72) Inventors: Francesco Ciaccio, Alessandria (IT); Annamaria Antonaci, Alessandria (IT); Eddy Bonello, Villanova Monferrato (IT); Stephane Schoch, Beinstein (DE); Wolfgang Klaeger, Leonberg (DE); Beate Seiler, Obersulm (DE); José Camerano, Ludwigsburg (DE); Debra L. Singer, Wexford, PA (US); John E. Schwendeman, Wexford, PA (US); Shanti Swarup, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 16/020,022

(22) Filed: Jun. 27, 2018

(65) Prior Publication Data
US 2018/0312626 A1 Nov. 1, 2018

Related U.S. Application Data

(63) Continuation of application No. 14/967,763, filed on Dec. 14, 2015, now Pat. No. 10,035,872, which is a continuation-in-part of application No. 12/752,570, filed on Apr. 1, 2010, now Pat. No. 9,708,504.

(51) Int. Cl.
| | |
|---|---|
| *C08G 18/75* | (2006.01) |
| *C08G 18/32* | (2006.01) |
| *C09D 175/06* | (2006.01) |
| *B05D 7/00* | (2006.01) |
| *B05D 3/02* | (2006.01) |
| *C25D 13/22* | (2006.01) |
| *C08F 299/04* | (2006.01) |
| *C09D 167/06* | (2006.01) |
| *C08G 18/68* | (2006.01) |
| *C08G 63/52* | (2006.01) |
| *C08G 63/685* | (2006.01) |
| *C08G 18/08* | (2006.01) |
| *C08G 18/10* | (2006.01) |
| *C25D 13/20* | (2006.01) |

(52) U.S. Cl.
CPC ......... *C08G 18/757* (2013.01); *B05D 3/0254* (2013.01); *B05D 7/572* (2013.01); *B05D 7/574* (2013.01); *C08F 299/04* (2013.01); *C08G 18/0823* (2013.01); *C08G 18/10* (2013.01); *C08G 18/3221* (2013.01); *C08G 18/68* (2013.01); *C08G 18/755* (2013.01); *C08G 63/52* (2013.01); *C08G 63/6858* (2013.01); *C09D 167/06* (2013.01); *C09D 175/06* (2013.01); *C25D 13/20* (2013.01); *C25D 13/22* (2013.01); *B05D 7/576* (2013.01); *Y10T 428/1355* (2015.01); *Y10T 428/31786* (2015.04)

(58) Field of Classification Search
CPC ... C08G 63/181; C08F 299/04; C09D 167/02; C09D 167/06; Y10T 428/31507; Y10T 428/31681; Y10T 428/31876
See application file for complete search history.

(56) References Cited

U.S. PATENT DOCUMENTS

| | | | |
|---|---|---|---|
| 3,247,640 | A | 4/1966 | De Wayne Miles et al. |
| 3,485,732 | A | 12/1969 | D'Alelio |
| 3,485,733 | A | 12/1969 | D'Alelio |
| 3,804,920 | A | 4/1974 | Cunningham et al. |
| 3,953,403 | A | 4/1976 | Fujiyoshi et al. |
| 4,071,578 | A | 1/1978 | Lasher |
| 4,212,901 | A | 7/1980 | van Neerbos et al. |
| 4,229,555 | A | 10/1980 | Tobias |
| 4,240,947 | A | 12/1980 | Falk |
| 4,393,121 | A | 7/1983 | Tobias et al. |
| 4,426,478 | A | 1/1984 | Noyes et al. |
| 4,463,150 | A | 7/1984 | Kelley |
| 4,520,188 | A | 5/1985 | Holzrichter et al. |
| 4,968,775 | A | 11/1990 | Toman et al. |
| 5,227,460 | A | 7/1993 | Mahabadi et al. |
| 5,380,816 | A | 1/1995 | Sullivan |
| 5,391,452 | A | 2/1995 | Sacripante et al. |
| 5,763,099 | A | 6/1998 | Misev et al. |
| 5,830,928 | A | 11/1998 | Faler et al. |
| 5,929,197 | A | 7/1999 | Kohler et al. |
| 6,077,917 | A | 6/2000 | Tachika et al. |
| 6,194,525 | B1 | 2/2001 | Ortiz et al. |
| 6,214,898 | B1 | 4/2001 | Diloy Barrio |
| 6,268,464 | B1 | 7/2001 | Keinanen et al. |
| 6,291,581 | B1 | 9/2001 | Bayards et al. |
| 6,413,648 | B1 | 7/2002 | Heyenk et al. |
| 6,812,269 | B2 | 11/2004 | Koenraadt et al. |
| 6,897,265 | B2 | 5/2005 | Algrim et al. |
| 7,071,267 | B2 | 7/2006 | Algrim et al. |
| 7,381,472 | B2 | 6/2008 | Brandenburger et al. |
| 8,497,316 | B2 | 7/2013 | Darby |

(Continued)

FOREIGN PATENT DOCUMENTS

| | | |
|---|---|---|
| CA | 2010012 | 8/1990 |
| WO | WO 9738034 | 10/1997 |

(Continued)

OTHER PUBLICATIONS

Pourreau, Daniel B. et al., "Bang for The Buck", Modern Paint & Coatings Magazine; Oct. 1999; pp. 1-4.

(Continued)

*Primary Examiner* — Robert S Jones
(74) *Attorney, Agent, or Firm* — Krisanne Shideler

(57) ABSTRACT

Coatings comprising an uncured branched polyester-urethane resin prepared by free radical polymerization of an unsaturated polyester prepolymer having a polyol segment, an unsaturated polycarboxylic acid and/or an anhydride and/or ester thereof, and a urethane segment, wherein the polymerization occurs primarily by reaction of the unsaturation are disclosed.

10 Claims, No Drawings

(56) References Cited

U.S. PATENT DOCUMENTS

| | | |
|---|---|---|
| 10,035,872 B2 | 7/2018 | Ciaccio et al. |
| 2001/0020048 A1 | 9/2001 | Yamaguchi et al. |
| 2002/0002237 A1 | 1/2002 | Irle et al. |
| 2004/0039087 A1 | 2/2004 | Nishikubo et al. |
| 2004/0044117 A1 | 3/2004 | Kiefer-Liptak et al. |
| 2006/0115665 A1 | 6/2006 | Bolm et al. |
| 2011/0021694 A1 | 1/2011 | Trindade |
| 2011/0244156 A1 | 10/2011 | Lock et al. |
| 2011/0244157 A1 | 10/2011 | Singer et al. |
| 2012/0082795 A1 | 4/2012 | Verardi et al. |
| 2015/0064476 A1 | 3/2015 | Kanda |

FOREIGN PATENT DOCUMENTS

| | | |
|---|---|---|
| WO | WO 0055265 | 9/2000 |
| WO | WO 2015/153844 | 4/2015 |

OTHER PUBLICATIONS

Misev, T. A. et al., "Powder coatings technology: new developments at the turn of the century", Progress in Organic Coatings; Apr. 1998; pp. 160-168; vol. 34; Elsevier.

COATINGS COMPRISING BRANCHED POLYESTER-URETHANE RESINS

CROSS REFERENCE TO RELATED APPLICATIONS

This application is a continuation of U.S. patent application Ser. No. 14/967,763, filed Dec. 14, 2015, entitled: "BRANCHED POLYESTER POLYMERS AND COATINGS COMPRISING THE SAME", which in turn is a continuation-in-part application of U.S. patent application Ser. No. 12/752,570, filed Apr. 1, 2010, entitled: "BRANCHED POLYESTER POLYMERS AND COATINGS COMPRISING THE SAME", now U.S. Pat. No. 9,708,504.

FIELD OF THE INVENTION

The present invention relates to coatings comprising such polyester-urethane resins and substrates to which such coatings are applied.

BACKGROUND OF THE INVENTION

In the automotive industry, it is often desirable to apply protective and/or decorative coatings to vehicles. Such coating may, for example, provide resistance to abrasive chipping of road dirt and debris, such as sand and gravel that may cause an aesthetically unpleasing chipping of the vehicles paint. Coating compositions having acceptable chip resistance and decorative properties are desired.

SUMMARY OF THE INVENTION

The present invention is directed to coating compositions comprising uncured branched polyester-urethane resins prepared by free radical polymerization of the double bonds of an unsaturated polyester-urethane prepolymer, the prepolymer prepared from: a) one or more polyols; b) one or more unsaturated polycarboxylic acids and/or anhydrides and/or esters thereof and c) one or more isocyanates; wherein the branched polyester-urethane resin is not prepared from unsaturated monomers other than the unsaturated polycarboxylic acids and/or anhydrides and/or esters thereof of b), and wherein the branched polyester-urethane resin is not a graft copolymer. The coating compositions further comprise a crosslinker ii) selected from phenolic resins, amino resins, epoxy resins, isocyanate resins, beta-hydroxy (alkyl) amide resins, alkylated carbamate resins, polyacids, anhydrides, organometallic acid-functional materials, polyamines, polyamides, aminoplasts and mixtures thereof.

DETAILED DESCRIPTION OF THE INVENTION

The present invention is directed to uncured branched polyester-urethane resins, generally comprising a reaction product comprising a polyol segment, an unsaturated polycarboxylic acid and/or an anhydride and/or ester thereof, and a urethane segment. Free radical initiators are used to initiate polymerization through the unsaturation of the unsaturated polyester-urethane prepolymer thereby resulting in an uncured branched polyester-urethane resin. The branched polyester-urethane resin is uncured or in other words "curable" and/or "crosslinkable", which means that it can undergo crosslinking with another compound to form a cured coating, but is not itself a cured coating. That is, the polyester-urethane polymer has functionality that will react with functionality on another compound, such as a crosslinker. Reaction of the unsaturation of the prepolymers results in the uncured, crosslinkable branched polyester-urethane resin. For clarity, this polyester-urethane is a polymer resin. It is not a cured coating. The present invention is therefore distinct from art in which reacting the points of unsaturation on monomers and/or polymers results in curing of the coating.

The polyester-urethane prepolymer is prepared by reacting one or more polyols with one or more unsaturated polycarboxylic acids/anhydrides/esters and with one or more isocyanates.

As used herein, "Polyol" and like terms, refers to a compound having two or more hydroxyl groups. The polyol used to form the polyol segment or a "residual moiety of a polyol" is sometimes referred to herein as the "polyol segment monomer". A "residual moiety" means the moiety or segment of a molecule that is derived from a particular monomer. For example a "residual moiety of a polyol" means a moiety derived from a polyol monomer. Polyols can also be chosen to contribute hardness or softness to the prepolymer, however, the polyol(s) used and amount of each should be selected so that the unsaturated prepolymers, when reacted, result in a branched polyester having the desired glass transition temperature (Tg). The polyol can have 2 to 36 atoms. Suitable polyols for use in the invention may be any polyols known for making polyesters. Examples include, but are not limited to, alkylene glycols, such as ethylene glycol, propylene glycol, diethylene glycol, dipropylene glycol, triethylene glycol, tripropylene glycol, hexylene glycol, polyethylene glycol, polypropylene glycol and neopentyl glycol; hydrogenated bisphenol A; cyclohexanediol; propanediols including 1,2-propanediol, 1,3-propanediol, butyl ethyl propanediol, 2-methyl-1,3-propanediol, and 2-ethyl-2-butyl-1,3-propanediol; butanediols including 1,4-butanediol, 1,3-butanediol, and 2-ethyl-1,4-butanediol; pentanediols including trimethyl pentanediol and 2-methylpentanediol; cyclohexanedimethanol; hexanediols including 1,6-hexanediol; caprolactonediol (for example, the reaction product of epsilon-caprolactone and ethylene glycol); hydroxy-alkylated bisphenols; polyether glycols, for example, poly(oxytetramethylene) glycol; trimethylol propane, pentaerythritol, di-pentaerythritol, trimethylol ethane, trimethylol butane, dimethylol cyclohexane, glycerol and the like. Suitable unsaturated polyols for use in the invention may be any unsaturated alcohols containing two or more hydroxyl groups. Examples include, but are not limited to, trimethylol propane monoallyl ether, trimethylol ethane monoallyl ether and prop-1-ene-1,3-diol. The polyol segment can also comprise some mono-ol, such as up to 10 weight %, or 5 weight %, based on the total weight of the polyol segment. The polyol segment can be saturated.

The unsaturated polyester-urethane prepolymer further comprises an unsaturated polycarboxylic acid, anhydride and/or ester, or the residual moiety derived therefrom. Suitable unsaturated polyacids for use in the invention may be any unsaturated carboxylic acid containing two or more carboxy groups and/or an ester and/or anhydride thereof. Examples include, but are not limited to, maleic acid, fumaric acid, itaconic acid, citraconic acid, mesaconic acid and teraconic acid, and/or esters and/or anhydrides thereof. A particularly suitable unsaturated polyacid is maleic acid, maleic anhydride or a $C_1$-$C_6$ alkyl ester of maleic acid. The unsaturated polycarboxylic acid/anhydride/ester can comprise 3 to 10 weight % of the polyester-urethane prepolymer, such as 4 to 7 weight %.

As previously mentioned, the unsaturated polyester-urethane prepolymer comprises a urethane segment. A "urethane segment" will be understood as one having a urethane (NHCOO) functional group. While at least one of the polyester-urethane prepolymers used according to the present invention has a urethane segment, more than one or all of the prepolymers used can have such a urethane segment. It will be appreciated that use of at least one of the polyester-urethane prepolymers having a urethane segment will result in the urethane segment being present in the final polyester-urethane resin, and therefore also in a coating formed from such a resin. The urethane segment can comprise 5 to 45 weight % based on the total weight of the polyester-urethane prepolymer, such as 10 to 25 weight %.

The urethane segment can be incorporated in the polyester-urethane prepolymer by being reacted with an isocyanate having a (NCO) group or isocyanate functionality. The isocyanate can have 4 to 25 carbon atoms. Suitable isocyanates include aromatic and aliphatic polyisocyanates, including cycloaliphatic polyisocyanates and representative examples include diphenylmethane-4,4'-diisocyanate (MDI), 2,4- or 2,6-toluene diisocyanate (TDI), including mixtures thereof, p-phenylene diisocyanate, tetramethylene and hexamethylene diisocyanates, dicyclohexylmethane-4, 4'-diisocyanate, isophorone diisocyanate, mixtures of phenylmethane-4,4'-diisocyanate and polymethylene polyphenylisocyanate. Higher polyisocyanates such as triisocyanates can be used, for example, triphenyl methane-4,4',4''-triisocyanate. The isocyanates can be blocked or unblocked according to the present invention. Isocyanate prepolymers prepared in conjunction with polyols such as neopentyl glycol and trimethylolpropane and with polymeric polyols such as polycaprolactone diols and triols (NCO/OH equivalent ratio can be greater than 1) can also be used.

According to the present invention, the isocyanate can react with the polyol segment and the unsaturated polycarboxylic acid/anhydride/ester segment, or with a pre-reacted polyester prepolymer. The polyester-urethane prepolymer can also be formed by reacting a polyol segment, an unsaturated polycarboxylic acid/anhydride/ester segment and an isocyanate all together. As used herein, a "polyester prepolymer" means the reaction product of the polyol segment and the unsaturated polycarboxylic acid/anhydride/ester segment. For the polyester prepolymer, the ratio of reactive hydroxyl groups (OH) on the polyol segment to the acid groups on the unsaturated polycarboxylic acid/anhydride/ester segment may be 2:0.5, 2:1.5 or even higher. The higher the ratio, the higher the molecular weight of the reaction product. Because an excess of polyol is used, the reaction product polyester prepolymer has terminal hydroxyl functionality.

As will be discussed in more detail below, the polyester-urethane resin can be prepared to be used in a solvent-based system or a water-based system. For a solvent-based system, the isocyanate can react with the hydroxyl functionality of either the polyol segment or the polyester prepolymer such that the polyester-urethane prepolymer has a ratio of the isocyanate functional groups (NCO) to the hydroxyl groups (OH) of 1:2 to 1:1.5. For water-based systems, the polyester-urethane prepolymer can be prepared such that it contains unreacted OH-functionality and unreacted NCO-functionality that allows it to be further reacted with a hydroxyl group containing carboxylic acid to become acid functionalized. The acid functionalize prepolymer can then be neutralized with a base, dispersed and polymerized in water. Accordingly, the polyester-urethane prepolymer can have 10% to 30% unreacted NCO groups and 70% to 90% unreacted OH groups. Typically, the reaction with the isocyanate is conducted at a temperature of from 50° C. to 120° C. According to the present invention, the reaction with an isocyanate can be performed in any non-alcohol organic solvent. Suitable non-alcohol organic solvents include butyl acetate, amyl acetate, methyl isobutyl ketone, methyl ethyl ketone, propylene glycol monomethyl ether or mixtures thereof.

According to the present invention, the resulting unsaturated polyester-urethane prepolymer will have hydroxyl terminal functionality and unsaturation. The average functionality of the unsaturation of the polyester-urethane prepolymer can be in the range of 1 to 5, such as 2 to 4 and can be 2 or greater. Although not wishing to be bound by this mechanism, it is believed higher hydroxyl functionality provides a resulting resin and any coating containing such resin to have more reaction and/or crosslinking sites to react with a crosslinker in the present coating composition and/or an adjacent coating layer thereby providing better intercoat adhesion between two adjacent coating layers, better chip resistance and sag resistance properties.

The unsaturated polyester-urethane prepolymer can further comprise one or more monomers that contribute to the overall properties of the polyester, including "softness", stain resistance, durability, chemical resistance, and/or mechanical resistance. For example, one or more monomers that contribute a "soft segment" can be used with the one or more polyols and one or more unsaturated polycarboxylic acids/anhydrides/esters. As used herein, "soft segment" and like terms refers to a monomer or residue thereof or mixtures thereof that contribute flexibility to the prepolymer, and can help to obtain the desired Tg and/or viscosity of the branched polyester-urethane resin. The soft segment can be the residue of, for example, a polyacid. "Polyacid" and like terms, as used herein, refers to a compound having two or more acid groups and includes the ester and/or anhydride of the acid. Such acids can include, for example, linear acids that impart flexibility. Examples include but are not limited to saturated polyacids such as adipic acid, azelaic acid, sebacic acid, succinic acid, glutaric acid, decanoic diacid, dodecanoic diacid and esters and anhydrides thereof. Suitable monoacids include C1-C18 aliphatic carboxylic acids such as acetic acid, propanoic acid, butanoic acid, hexanoic acid, oleic acid, linoleic acid, undecanoic acid, lauric acid, isononanoic acid, other fatty acids, and hydrogenated fatty acids of naturally occurring oils; and/or esters and/or anhydrides of any of these.

The uncured branched polyester-urethane prepolymer of the present invention can further include a hard segment. As used herein, "hard segment" and like terms refers to monomers or residues thereof that contribute rigidity rather than flexibility to the prepolymer. The hard segment can be the residue of, for example, a polyacid. The polyacid can be an aromatic acid or a cycloaliphatic acid, suitable examples of which include, but are not limited to, phthalic acid, isophthalic acid, 5-tert-butylisophthalic acid, tetrachlorophthalic acid, tetrahydrophthalic acid, naphthalene polycarboxylic acid, terephthalic acid, hexahydrophthalic acid, methylhexahydrophthalic acid, dimethyl terephthalate, cyclohexane dicarboxylic acid, chlorendic anhydride, 1,3-cyclohexane dicarboxylic acid, 1,4-cyclohexane dicarboxylic acid, tricyclodecane polycarboxylic acid, endomethylene tetrahydrophthalic acid, endoethylene hexahydrophthalic acid, cyclohexanetetra carboxylic acid, cyclobutane tetracarboxylic acid and esters and anhydrides thereof and/or combinations thereof. The monomer that contributes a hard segment is sometimes referred to herein as a "hard segment monomer". One skilled in the art, therefore, will need to determine the acids used and amounts of each acid to impart the desired flexibility or rigidity and feel, as well as other desired properties such as stain resistance, to the final coating.

Other monomer components can also be used in formation of the prepolymer to impart one or more additional properties to the branched polyester-urethane resin and/or coating comprising the same. For example, phthalic anhydride can be included, such as in amounts of 2 to 20 weight % of the prepolymer; phthalic anhydride might impart greater stain resistance to the coating. Fatty diacids could be added to increase hydrophobicity, while a polyether such as poly THF could be used to make the branched polyester-urethane resin more hydrophilic. Diene monomers, such as butadiene, may also contribute to soft feel, chemical resistance, and/or flexibility, and such as dicylcopentadiene, which may contribute to durability and a rubber-like feel.

According to the present invention, the unsaturated polyester-urethane prepolymer is polymerized in the presence of a free radical initiator. Any free radical initiator typically used to initiate the polymerization of unsaturated compounds containing double bonds may be used in the free radical polymerization. For example, the free radical initiator can be an azo initiator or a peroxide initiator, such as tert-butyl peroxy-2-ethylhexanoate, tert-butyl peroxybenzoate or dibenzoyl peroxide. Such free radical initiators are commercially available from Arkema as LUPEROX 26. The ratio of initiator to unsaturated acid/anhydride/ester may be varied depending upon the degree of branching of the chains of the polyester that is desired. For example, the molar ratio of the initiator to the average number of double bonds per chain of the unsaturated acid/anhydride/ester may be 0.001 to 1.0, such as 0.01 to 0.9 or 0.5 to 1.

Accordingly, unsaturation from one acid/anhydride/ester moiety in the reaction product reacts with the unsaturation of another. The result is a branched polyester polymer. At least some if not all of the branches will have terminal hydroxyl groups. There may also be pendant functionality in the branched polyester as well, depending on the starting materials used. Typically, when initiator is used in conjunction with unsaturated acid/anhydride/esters, a linear polymer results. It was therefore a very surprising and unexpected result to achieve a branched polyester-urethane resin according to the present invention. It will be appreciated that the branching in the present invention is predominantly achieved through reaction of the unsaturation. It is possible to contribute a minor degree of branching through the use of a tri- or tetra-ol, although the amount of such compound should be selected to avoid gellation. It will be appreciated that the present methods for achieving branching through the use of polymerizing the unsaturation of a polycarboxylic acid and polyesters resulting therefrom are quite unique when compared with conventional branched polyester-urethane resins, such as those made through the use of tri- or tetra-ols.

Depending upon the degree of control of the polymerization that is desired, the initiator can be added in different portions at different times. For example, all of the free radical initiator may be added at the start of the reaction, the initiator may be divided into portions and the portions added at intervals during the reaction, or the initiator may be added as a continuous feed. It will be appreciated that the addition of initiator at set intervals or in a continuous feed will result in a more controlled process than adding all of the initiator at the start.

Regardless of the manner in which the polyester-urethane prepolymer is made, whether a polyester prepolymer is formed first or the polyol segment and polycarboxylic acid/anhydride/ester are reacted directly with the isocyanate, how and when the initiator is added, and the like, the resulting branch polyester-urethane resin will actually be a mixture of polyester-urethane resins with varying degrees of unsaturation, chain length, branching and the like. Some of the resulting products may even be a monoester, but is still encompassed by the term "polyester" as used herein.

The temperature at which the free radical polymerization reaction is conducted may be varied depending on factors such as the composition of the unsaturated acid/anhydride/ester, the polyol segment monomer, the urethane segment the initiator, the solvent and the properties that are desired in the polyester. Typically, the free radical polymerization is conducted at a temperature of from 50° C. to 150° C. In a typical polymerization, such as an acrylic polymerization, the higher temperature results in a higher concentration of free radical initiator, which in turn results in more chains being polymerized, each with a relatively low molecular weight. It has been surprisingly discovered in the present system, particularly when maleic is used, the higher the initiator concentration, the higher the molecular weight of the resulting polymer. This is a surprising result as those skilled in the art would not have expected the present polymerization to occur. Too much initiator, however, can lead to gellation when polymerization occurs in a solvent phase. The polyester-urethane resin of the present invention can be ungelled.

While any means can be used to effect the polymerization, for ease of handling, the free radical polymerization can be performed using solutions of the unsaturated acid/anhydride/ester, urethane segment and polyol segment monomer. The free radical polymerization can be performed in a solvent-based or water-based system. Any solvent may be used, as long as it is able to dissolve the components including the free radical initiator to a sufficient degree to allow the polymerization to take place efficiently. Typical examples of suitable solvents include butyl glycol, propylene glycol mono methyl ether, glycol diether, methoxy propyl acetate and xylene. Preparation of the polyester-urethane resin in solvent is sometimes referred to herein as a "solvent-based system", which means that greater than 50%, such as up to 100%, of the solvent is an organic solvent, and less than 50% of the solvent, such as less than 20%, less than 10%, less than 5%, or less than 2% of the solvent is water.

Alternatively, the polyester-urethane resin can be prepared in a water-based system. A "water-based system" is one in which greater than 50%, such as up to 100%, of the solvent is water, and less than 50% of the solvent, such as less than 20%, less than 10%, less than 5%, or less than 2% of the solvent is an organic solvent. If the unsaturated polyester-urethane prepolymer has sufficient carboxylic acid groups, it may be converted into a water-diluted material by neutralization, or partial neutralization, with a suitable base, followed by addition of the water. Non-limiting examples of suitable bases for the neutralization include dimethylethanolamine, triethylamine and 2-amino-2-methyl propanol. This aqueous material can then be polymerized with free radicals as described above. Alternatively, the unsaturated polyester prepolymer may be mixed with surfactant and/or polymeric stabilizer material followed by mixing with water prior to free radical polymerization as described previously. It will also be apparent to those skilled in the art that these aqueous mixtures may contain additional organic cosolvents, examples of which include, but are not limited to, butyl glycol, butyl diglycol, glycol diether and propylene glycol monomethyl ether. Such organic cosolvents are commercially available from the Dow Chemical Company as PROGLYDE DMM.

The present invention has been described as preparing the polyester-urethane prepolymer by reacting an isocyanate with the polyol segment, and the unsaturated polycarboxylic acid/anhydride/ester segment, or with a polyolester prepolymer and then polymerized by the free radical polymerization reaction. The polyester-urethane resin can also be prepared by forming at least one polyester prepolymer by reacting a polyol segment and an unsaturated polycarboxylic acid/anhydride/ester segment; and polymerizing the at least one unsaturated polyester prepolymer through free radical polymerization of a double bond to form a hydroxyl functional polyester polymer. The polyester polymer can have an equivalent ratio of hydroxyl (OH) group to isocyanate (NCO) group greater than 1. The polyester polymer can subsequently be reacted with an isocyanate to form a polyester-urethane polymer. The polyester-urethane polymer can be prepared such that it can have an excess of NCO functionality. The excess NCO functionality allows the polyester-urethane polymer to be reacted with a hydroxyl group containing carboxylic acid and neutralized with a base prior to dispersing in an aqueous medium.

In either the solvent-based or the water-based system, the resulting polyester can be solid or liquid.

As noted above, the polyester-urethane polymers of the present invention are formed by free radical polymerization via the double bonds of an unsaturated polyester prepolymer comprising a terminal hydroxyl group. According to the present invention, two or more different unsaturated polyester-urethane prepolymers can be reacted together. "Different", in this context, means that one or more components used in two or more of unsaturated polyester-urethane prepolymers and/or the amount of one or more components used in two or more unsaturated polyester-urethane prepolymers can be different. For example, a polyester-urethane polymer according to the present invention can be prepared by reaction of polyester-urethane prepolymers comprised of the same components. The polyester-urethane resin can be prepared by reaction of two or more polyester-urethane prepolymers that are formed by different components. That is, a first polyester prepolymer comprising a terminal hydroxyl group and a second polyester prepolymer comprising a terminal hydroxyl group are reacted with an isocyanate; the components used to make the first and second prepolymers can be different, or can have one or more different components. In this example, the resulting polyester-urethane resin is likely to have random units derived from each type of prepolymer used. Thus, the present invention encompasses polyester-urethane resins prepared by the same or different urethane segments, polyol segments monomers, and/or unsaturated acids/anhydrides/esters and/or the same or different amounts of any of these. Use of different polyester prepolymers, urethane segments, polyol segment monomers, unsaturated acids/anhydrides/esters and/or amounts may result in polyester-urethane resins having different properties. In this manner, polyester-urethane resins can be formed that have desirable properties deriving from the use of the particular components used for the reaction product.

As noted above, the polyester-urethane polymer is formed by using free radical polymerization, wherein the unsaturation of the polycarboxylic acid/anhydride/ester moieties in the prepolymer polymerize. The reaction can run such that substantially all of the unsaturation is reacted in the formation of the polyester-urethane polymer. However, in some examples the resulting polyester-urethane polymer also comprises some degree of unsaturation. For example, the resulting polyester-urethane polymer can comprise enough unsaturation to render the polyester-urethane polymer reactive with other functional groups.

Because the branched polyester-urethane resin according to the present invention is formed primarily through the free radical polymerization of the unsaturation from the unsaturated acid/anhydride/ester, some of the terminal hydroxyl groups will remain unreacted in the polyester-urethane polymer of the present invention. These unreacted hydroxyl groups can then be crosslinked with another component. Thus, the present invention is distinct from art in which gelled polyesters, that is extensively networked polyesters, are formed. The present polyester-urethane resins can be thermoset upon reaction with a crosslinker, and therefore also distinct from art that teaches thermoplastic polyesters.

According to the present invention, it may be desirable to convert some or all of the hydroxyl functionality on the unsaturated polyester prepolymer, such as before polymerization takes place, and/or on the branched polyester to another functionality. For example, the hydroxyl can be reacted with a cyclic anhydride to result in acid functionality. Acid esters can also be formed.

The present invention contemplates the use of unsaturated monomers other than the unsaturated polyacid/anhydride/ester of the reaction product is excluded. For example, the use of vinyl monomers such as (meth)acrylates, styrene, vinyl halides and the like can be excluded. It will be appreciated therefore that the present branched polyester-urethane resins are not polyester/acrylic graft copolymers, which are widely known in the art.

The present polyester-urethane resins may specifically exclude polyester-urethane reins prepared from prepolymers that are formed by the reaction with aldehydes; as such acyl succinic acid polyesters can be specifically excluded. Similarly, use of aldehyde in the solvent can be specifically excluded.

The polyester-urethane resins of the present invention can have a relatively high molecular weight and functionality as compared to conventional linear polyester-urethane resins. Typically, the ratio of the weight average molecular weight ("Mw") of the branched polyester-urethane resin of the present invention to the Mw of the unsaturated polyester-urethane prepolymer is from 1.2 to 100, such as 4 or 5 to 50.

The branched polyester-urethane resins of the present invention may have an Mw as low as 600, or can have an Mw greater than 1000, such as greater than 5000, greater than 10,000, greater than 15,000, greater than 25,000, or greater than 50,000. Molecular weights of 80,000 and 100,000 are also contemplated by the present invention. Molecular weights higher than 100,000, up to 10,000,000, can be achieved. The molecular weight increase can be controlled by one or more factors such as the type and/or amount of initiator used, the amount of unsaturation on the prepolymer, the temperature and the type and/or amount of solvent. All molecular weights disclosed herein are determined by gel permeation chromatography utilizing a polystyrene standard for calibration.

In addition to the molecular weight described above, the branched unsaturated polyester-urethane resins of the present invention can also have a relatively high functionality; in some cases the functionality is higher than would be expected for conventional polyester-urethane resins having such molecular weights. The average functionality of the polyester-urethane resin can be 2.0 or greater, such as 2.5 or greater, 3.0 or greater, or even higher. "Average functionality" as used herein refers to the average number of functional groups on the branched polyester. The functionality of the branched polyester-urethane resin is measured by the number of hydroxyl groups that remain unreacted in the branched polyester-urethane resin, and not by the unreacted unsaturation. The hydroxyl value of the branched polyester-urethane polymers of the present invention can be from 10 to 500 mg KOH/gm, such as 30 to 250 mg KOH/gm, such as 75 to 120 mg KOH/gm as measured by ASTM Method D4274. The present branched polyester-urethanes can have both high Mw and high functionality, such as a Mw of ≥15,000, such as 20,000 to 40,000, or higher than 40,000, and a functionality of ≥100 mg KOH/gm.

Because the polyester-urethane resin of the present invention comprises functionality, it is suitable for use in coating formulations in which the hydroxyl groups (and/or other functionality) are crosslinked with other resins and/or crosslinkers typically used in coating formulations. Thus, the present invention is further directed to a coating comprising a branched polyester-urethane resin according to the present invention and a crosslinker therefor. The crosslinker, or crosslinking resin or agent, can be any suitable crosslinker or crosslinking resin known in the art, and will be chosen to be reactive with the functional group or groups on the polyester. It will be appreciated that the coatings of the present invention cure through the reaction of the hydroxyl groups and/or other functionality and the crosslinker and not through the double bonds of the polycarboxylic acid/anhydride/ester moiety, to the extent any such unsaturation exists in the branched polyester-urethane resin.

Non-limiting examples of suitable crosslinkers include phenolic resins, amino resins, epoxy resins, isocyanate resins, beta-hydroxy (alkyl) amide resins, alkylated carbamate resins, polyacids, anhydrides, organometallic acid-functional materials, polyamines, polyamides, aminoplasts and mixtures thereof. The crosslinker can be a phenolic resin comprising an alkylated phenol/formaldehyde resin with a functionality ≥3 and difunctional o-cresol/formaldehyde resins. Such crosslinkers are commercially available from Hexion as BAKELITE 6520LB and BAKELITE 7081LB.

Suitable crosslinking isocyanates include multifunctional isocyanates. Examples of multifunctional polyisocyanates include aliphatic diisocyanates like hexamethylene diisocyanate and isophorone diisocyanate, and aromatic diisocyanates like toluene diisocyanate and 4,4'-diphenylmethane diisocyanate. The polyisocyanates can be blocked or unblocked. Examples of other suitable polyisocyanates include isocyanurate trimers, allophanates, and uretdiones of diisocyanates and polycarbodiimides such as those disclosed in U.S. patent application Ser. No. 12/056,304 filed Mar. 27, 2008, incorporated by reference in pertinent part herein. Suitable polyisocyanates are well known in the art and widely available commercially. For example, suitable polyisocyanates are disclosed in U.S. Pat. No. 6,316,119 at columns 6, lines 19-36, incorporated by reference herein. Examples of commercially available polyisocyanates include DESMODUR VP2078 and DESMODUR N3390, which are sold by Bayer Corporation, and TOLONATE HDT90, which is sold by Rhodia Inc.

Suitable aminoplasts include condensates of amines and/or amides with aldehyde. For example, the condensate of melamine with formaldehyde is a suitable aminoplast. Suitable aminoplasts are well known in the art. A suitable aminoplast is disclosed, for example, in U.S. Pat. No. 6,316,119 at column 5, lines 45-55, incorporated by reference herein. An example of a commercially available aminoplast crosslinking resin includes RESIMENE HM 2608 which is sold by Ineos Melamines, LLC.

In preparing the present coatings, the branched polyester-urethane polymer and the crosslinker can be dissolved or dispersed in a single solvent or a mixture of solvents. Any solvent that will enable the formulation to be coated on a substrate may be used, and these will be well known to the person skilled in the art. Typical examples include water, organic solvent(s), and/or mixtures thereof. Suitable organic solvents include glycols, glycol ether alcohols, alcohols, ketones, and aromatics, such as xylene and toluene, acetates, mineral spirits, naphthas and/or mixtures thereof. "Acetates" include the glycol ether acetates. The solvent can be a non-aqueous solvent. "Non-aqueous solvent" and like terms means that less than 50% of the solvent is water. For example, less than 10%, or even less than 5% or 2%, of the solvent can be water. It will be understood that mixtures of solvents, including or excluding water in an amount of less than 50%, can constitute a "non-aqueous solvent". In some examples, the coating is aqueous or water-based. This means that 50% or more of the solvent is water. For example, the water-based coating can have less than 50%, such as less than 20%, less than 10%, less than 5% or less than 2% solvent.

The present invention also contemplates coatings further comprise a curing catalyst. Any curing catalyst typically used to catalyze crosslinking reactions between polyester resins and crosslinkers, such as phenolic resins, may be used, and there are no particular limitations on the catalyst. Examples of such a curing catalyst include phosphoric acid, alkyl aryl sulphonic acid, dodecyl benzene sulphonic acid, dinonyl naphthalene sulphonic acid, and dinonyl naphthalene disulphonic acid.

If desired, the coating compositions can comprise other optional materials well known in the art of formulating coatings in any of the components, such as colorants, plasticizers, abrasion resistant particles, anti-oxidants, hindered amine light stabilizers, UV light absorbers and stabilizers, surfactants, flow control agents, thixotropic agents, fillers, organic cosolvents, reactive diluents, catalysts, grind vehicles, and other customary auxiliaries.

As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, carbon fiber, graphite, other conductive pigments and/or fillers and mixtures thereof. The terms "pigment" and "colored filler" can be used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene aluminum, quinacridone, thiazole, thiazine, azo, indigoid, nitro, nitroso, oxazine, phthalocyanine, quinoline, stilbene, and triphenyl methane.

Example tints include, but are not limited to, pigments dispersed in water-based or water-miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemicals, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm Example nanoparticle dispersions and methods for making them are identified in U.S. Pat. No. 6,875,800 B2, which is incorporated by reference in pertinent part herein. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in United States Patent Application Publication 2005-0287348 A1, filed Jun. 24, 2004, U.S. Provisional Application Ser. No. 60/482,167 filed Jun. 24, 2003, and United States Patent Application Serial Number 11/337,062, filed January 20, 2006, which are incorporated by reference in pertinent part herein.

Example special effect compositions that may be used include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In a non-limiting example, special effect compositions can produce a color shift, such that the color of the coating changes when the coating is viewed at different angles. Example color effect compositions are identified in U. S. Pat. No. 6,894,086, incorporated by reference in pertinent part herein. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

The present invention can also include a photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. The photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions can include photochromic dyes.

Moreover, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with the present invention, have minimal migration out of the coating. Example photosensitive compositions and/or photochromic compositions and methods for making them are identified in U.S. application Ser. No. 10/892,919 filed Jul. 16, 2004, and incorporated herein by reference.

In general, the colorant can be present in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

An "abrasion resistant particle" is one that, when used in a coating, will impart some level of abrasion resistance to the coating as compared with the same coating lacking the particles. Suitable abrasion resistant particles include organic and/or inorganic particles. Examples of suitable organic particles include but are not limited to diamond particles, such as diamond dust particles, and particles formed from carbide materials; examples of carbide particles include but are not limited to titanium carbide, silicon carbide and boron carbide. Examples of suitable inorganic particles, include but are not limited to silica; alumina; alumina silicate; silica alumina; alkali aluminosilicate; borosilicate glass; nitrides including boron nitride and silicon nitride; oxides including titanium dioxide and zinc oxide; quartz; nepheline syenite; zircon such as in the form of zirconium oxide; buddeluyite; and eudialyte. Particles of any size can be used, as can mixtures of different particles and/or different sized particles. For example, the particles can be microparticles, having an average particle size of 0.1 to 50, 0.1 to 20, 1 to 12, 1 to 10, or 3 to 6 microns, or any combination within any of these ranges. The particles can be nanoparticles, having an average particle size of less than 0.1 micron, such as 0.8 to 500, 10 to 100, or 100 to 500 nanometers, or any combination within these ranges.

It will be appreciated that the polyester-urethane resin of the present invention and crosslinker therefor can form all or part of the film-forming resin of the coating. According to the present invention, one or more additional film-forming resins are also used in the coating. For example, the coating compositions can comprise any of a variety of thermoplastic and/or thermosetting compositions known in the art. The coating compositions may be water-based or solvent-based liquid compositions, or alternatively, may be in solid particulate form, i.e. a powder coating.

Thermosetting or curable coating compositions typically comprise film-forming polymers or resins having functional groups that are reactive with either themselves or a cross-linking agent. The additional film-forming resin can be selected from, for example, acrylic polymers, polyester polymers, polyurethane polymers, polyamide polymers, polyether polymers, polysiloxane polymers, copolymers thereof, and mixtures thereof. Generally, these polymers can be any polymers of these types made by any method known to those skilled in the art. Such polymers may be solvent-borne or water-dispersible, emulsifiable, or of limited water solubility. The functional groups on the film-forming resin may be selected from any of a variety of reactive functional groups including, for example, carboxylic acid groups, amine groups, epoxide groups, hydroxyl groups, thiol groups, carbamate groups, amide groups, urea groups, isocyanate groups (including blocked isocyanate groups) mercaptan groups, and combinations thereof. Appropriate mixtures of film-forming resins may also be used in the preparation of the present coating compositions.

Thermosetting coating compositions typically comprise a crosslinking agent that may be selected from any of the crosslinkers described above. For example, the present coatings comprise a thermosetting film-forming polymer or resin and a crosslinking agent therefor and the crosslinker is either the same or different from the crosslinker that is used to crosslink the polyester-urethane resin. The present invention can include a thermosetting film-forming polymer or resin having functional groups that are reactive with themselves are used; in this manner, such thermosetting coatings are self-crosslinking. The coatings of the present invention may comprise 1 to 100, such as 10 to 90 or 20 to 80 weight %, with weight % based on total solid weight of the coating, of the polyester-urethane resin of the present invention. The coating compositions of the present invention may also comprise 2 to 90, such as 5 to 60 or 10 to 40 weight %, with weight % based on total solids weight of the coating, of a crosslinker for the branched polyester-urethane resin. Additional components, if used, may comprise 1 weight %, up to 70 weight %, or higher, with weight % based on total solids weight of the coating.

According to the present invention, the polyester-urethane resin and/or coating comprising the polyester-urethane resin are substantially epoxy-free. As used herein, the term "substantially epoxy-free" means that the polyester-urethane resin and/or coating comprising the same are substantially free from epoxy, epoxy residue, oxirane rings or residues of oxirane rings, bisphenol A, BADGE or adducts of BADGE, bisphenol F, BFDGE or adducts of BFDGE. The polyester-urethane resin and/or coating comprising the same can be substantially free from bisphenol or residues thereof, including bisphenol A, bisphenol F, BADGE, and BFDGE. The polyester-urethane resin and/or the coatings comprising the same can also be substantially free of polyvinyl chloride or related halide-containing vinyl polymers. "Substantially free" means that the polyester and/or coating comprise 10 weight % or less, such as 5 weight % or less, 2 weight % or less or 1 weight % or less, based on total solids weight, of the compounds in any of the forms listed herein or otherwise known. Thus, it will be understood that polyester-urethane resins and/or coatings according to the present invention can comprise trace or minor amounts of these components and still be "substantially free" of them. The present invention also contemplates, the polyester-urethane resins and/or coatings comprising the same being completely free of any of the compounds listed above, or derivatives thereof.

The present coatings can be applied to any substrates known in the art, for example, automotive substrates, industrial substrates, packaging substrates, wood flooring and furniture, apparel, electronics including housings and circuit boards, glass and transparencies, sports equipment including golf balls, and the like. These substrates can be, for example, metallic or non-metallic. Metallic substrates include tin, steel, tin-plated steel, chromium passivated steel, galvanized steel, aluminum, aluminum foil. Non-metallic substrates include polymeric, plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethylene-terephthalate) ("PET"), polycarbonate, polycarbonate acrylobutadiene styrene ("PC/ABS"), polyamide, wood, veneer, wood composite, particle board, medium density fiberboard, cement, stone, glass, paper, cardboard, textiles, leather both synthetic and natural, and the like. The substrate can be one that has been already treated in some manner, such as to impart visual and/or color effect.

The coatings of the present invention can be applied by any means standard in the art, such as electrocoating, spraying, electrostatic spraying, dipping, rolling, brushing, and the like.

The coatings can be applied to a dry film thickness of 0.04 mils to 4 mils, such as 0.3 to 2 or 0.7 to 1.3 mils. It is also contemplated, the coatings can be applied to a dry film thickness of 0.1 mils or greater, 0.5 mils or greater 1.0 mils or greater, 2.0 mils or greater, 5.0 mils or greater, or even thicker. The coatings of the present invention can be used alone, or in combination with one or more other coatings. For example, the coatings of the present invention can comprise a colorant or not and can be used as a primer, basecoat, and/or top coat. For substrates coated with multiple coatings, one or more of those coatings can be coatings as described herein. The present coatings can also be used as a packaging "size" coating, wash coat, spray coat, end coat, and the like.

As previously noted, the polyester-urethane resin of the present invention can be used in a coating composition for automobiles. Further, the polyester resin can be used in the formation of a multilayer coating systems, which may include two or more coating layers at least one of which includes the polyester-urethane resin as described herein. For example, multilayer coating systems may include a first basecoat layer and an optional clearcoat layer. The multilayer coating systems can further include a second basecoat layer and an optional electrodeposition coat layer. The coating compositions of the present invention are particularly suitable for use in a compact coating process. A "compact coating process" or "compact process" is one in which at least one curing step has been eliminated from a standard automotive coating process; stated another way, one or more curing steps are combined in a compact coating process in that one or more coating layers may be deposited on a previous coating layer, which may be optionally be dried but not cured, in a "wet-on-wet" application the layers are cured simultaneously. Often, a compact process will eliminate the use of, and need to cure, a primer-surfacer layer; in the compact process a standard primer-surfacer layer can be replaced with a first basecoat layer. Some compact processes apply two basecoat layers, also known as a first basecoat layer (B1) and a second basecoat layer (B2), to a substrate. The polyester-urethane resin disclosed herein can be used in a basecoat composition that forms either or both the first basecoat layer and second basecoat layer.

The optional electrodeposition coating compositions of the multilayer coating systems may include conventional anionic or cationic electrodepositable coating compositions, such as epoxy or polyurethane-based coatings. Suitable electrodepositable coating compositions have been described in U.S. Pat. Nos. 4,933,056; 5,530,043; 5,760,107 and 5,820,987. The cured electrodeposited layer, if used, can have a dry-film thickness has high as 100 micrometers, such as 15 to 50 micrometers.

As noted above, when one or more basecoats are used in multilayer coating systems, they can be deposited from the present coating compositions. Other suitable basecoat compositions that may be used in multilayer coating systems of the present inventions are discussed in U.S. Pat. Nos. 8,152,982 and 8,846,156. If two or more basecoats are used, the basecoats can be the same or different. "Different" can include at least two different coating compositions where at least one is a coating composition incorporating the branched unsaturated polyester-urethane resin according to the present invention. "Different can also include at least two different coating compositions incorporating the branched polyester-urethane resin but in different amounts, ratios and/or including other components or additives. After application to at least a portion of the substrate, the first basecoat composition can be dried at ambient or elevated temperatures such as by forced air, or thermally cured. "Dried", "drying" and like terms, when used in reference to an application of the coating layers refers to removal of at least come water and/or solvent from the coating composition at temperatures lower than those needed to cure the coating and includes, for example processes such as flashing or dehydrating. For example, drying can include a "flash" which is generally performed by exposing a coated substrate to ambient or slightly elevated temperatures (typically 40° C. or lower) for a brief period of time (typically 30 seconds to 20 minutes) to remove some solvents(s) but not as much as in a dehydrating process, in which a coated substrate is exposed to a temperature (typically in the range of 40° C. to 121° C.) for a period of time sufficient to remove solvents but insufficient to cure the coated substrate, such as 1 to 10 minutes. By drying at "ambient" it is meant that at least a portion of the solvents, e.g. including water or organic solvents, in the coating compositions can be removed without aid of heat or energy, for example, without baking in an oven, use of forced air, or the like.

Similarly, if used, a second basecoat layer can be deposited on at least a portion of substrate coated with the first basecoat and the coated substrate subjected again to a drying step as described above. If the first basecoat was only dried, and not cured, then the two basecoat layers can be cured simultaneously at this time. It will be appreciated that one curing step can therefore be eliminated by the wet-on-wet application of the second basecoat over the uncured first basecoat and simultaneous curing of the two basecoats together. The dry-film thickness of the first and second basecoat layers (or, alternatively, a single basecoat layer where applicable) can be as high as 100 micrometers, but usually from 1 to 50, such as from 5 to 30, or from 10 to 25 micrometers.

The multilayer coating system can optionally include a clearcoat layer. If used, the clearcoat composition can comprise the branched unsaturated polyester-urethane resin of the present invention. Alternatively, the present invention may include the use of a conventional clearcoat composition. A clearcoat will be understood as a coating that is substantially transparent. A clearcoat can therefore have some degree of color, provided it does not make the clearcoat opaque or otherwise affect, to any significant degree, the ability to see the underlying substrate. The clearcoats can be used, for example, in conjunction with a pigmented basecoat layer. The clearcoat can be formulated as is known in the coatings art. Other suitable clearcoat compositions are described in U.S. Pat. Nos. 4,650,718; 5,814,410; and 5,891,981. The multilayer coating systems of the present invention can include, for example, an optional clearcoat layer deposited on at least a portion of the substrate coated with the one or more basecoat layers as described above. The clearcoat layer can be applied to a basecoat layer and cured using any conventional means. The clearcoat can be applied to a dried but uncured basecoat and the layers cured simultaneously, or the basecoat(s) can be cured prior to application of the clearcoat. Once applied and cured, the dry-film thickness of the clearcoat layer can be as high as 100 micrometers, but usually ranges 15-80 micrometers, as such from 30 to 60 micrometers.

According to the present invention, the coating can be used as a primer, such as an anti-chip primer. Anti-chip primer coating compositions are known in the automotive OEM industry, and are generally applied onto various locations of a vehicle such as the leading edges of doors, fenders, hoods and on the A pillar of a vehicle prior to application of a primer-surfacer coating composition over the entire vehicular body. The anti-chip primer coating composition does not need to be cured prior to application of one or more subsequent coating layers. Rather, the anti-chip primer coating composition is subjected to an ambient flash step, wherein it is exposed to ambient air for a certain period of time in order to allow for the evaporation of a portion of organic solvent from the anti-chip coating composition. Cure of the anti-chip primer coating composition occurs simultaneously with the one or more additional coating layers (co-cured). Primers according to the present invention, including anti-chip primers, will typically comprise some colorant and will typically be used with one or more additional coating layers such as after an electrocoat layer and before a primer surface layer, a colored basecoat layer a clearcoat layer and the like.

It will be appreciated that the coatings described herein can be either one component ("1K"), or multi-component compositions such as two component ("2K") or more. A 1K composition will be understood as referring to a composition wherein all the coating components are maintained in the same container after manufacture, during storage, etc. A 1K coating can be applied to a substrate and cured by any conventional means, such as by heating, forced air, and the like. The present coatings can also be multi-component coatings, which will be understood as coatings in which various components are maintained separately until just prior to application. As noted above, the present coatings can be thermoplastic or thermosetting.

The present invention is also directed to a process for forming a multilayer coating system on a substrate, the process comprising: forming a first basecoat layer over at least a portion of a substrate by depositing a first basecoat composition over at least a portion of the substrate; optionally, drying or curing the first basecoat layer; optionally forming a second basecoat layer over at least a portion of the first basecoat layer by depositing a second basecoat composition directly onto at least a portion of the first basecoat layer; optionally drying or curing the second basecoat; optionally forming a clearcoat layer on at least a portion of the outermost basecoat layer by depositing a clearcoat composition directly onto at least a portion of the outermost basecoat layer; and curing any uncured coating layer simultaneously, wherein at least one of the first basecoat composition and second basecoat composition comprise a polyester-urethane resin of the present invention. The second basecoat composition, if used can be the same or different from the first basecoat composition. It will be appreciated that the first and second basecoat, if used, can be cured individually, can be cured simultaneously, in both cases prior to forming the subsequent coating layer, or can be cured simultaneously with the optional clearcoat. The process can further include the step of forming an electrodeposition coating layer by electrodepositing an electrodepositable coating composition on at least a portion of the substrate prior to the step of forming the first basecoat layer. The electrodeposition coating layer can be dried or cured prior to forming the first basecoat layer.

It has been surprisingly discovered that a multi-coating system having a coating composition, such as a basecoat composition, that incorporates the uncured branched polyester-urethane resin of the present invention can impart improved intercoating adhesion, chip resistance and sag resistance properties in the coating, as compared to similar multi-coating systems that use conventional polyester-urethane resins and polyurethane resins coating compositions. This is particularly the case if 10%-30% of OH, remain unreacted in the polyester-urethane prepolymer For example, such a coating can have chip resistance properties lower than 2 as measured with an Erichsen stone hammer blow testing instrument model 508 operated at 2 bar and 25° C. Moreover, such a coating can have intercoating adhesion properties greater than 90%, and even greater than 95% when subjected to a windshield adhesion test using a Sikaflex windshield adhesive (250HMV-2+) obtained from Silka Schweiz AG and cured for 10 days under 100% humidity at a temperature of 40° C. In addition, a coating of the present invention can have a sag resistance greater than 15 µ, as such as 20 µ or greater. Stated another way, the coating of the present invention can be applied to a dry film thickness of greater than 15 µ before paint sag reaches the tolerance limit of less than 3 mm as describe below.

Coil coatings, having wide application in many industries, are also within the scope of the present invention; the present coatings are suitable as coil coatings due to their unique combination of flexibility and hardness, as discussed above. Coil coatings also typically comprise a colorant.

The coatings of the present invention are also suitable for use as packaging coatings. The application of various pretreatments and coatings to packaging is well established. Such treatments and/or coatings, for example, can be used in the case of metal cans, wherein the treatment and/or coating is used to retard or inhibit corrosion, provide a decorative coating, provide ease of handling during the manufacturing process, and the like. Coatings can be applied to the interior of such cans to prevent the contents from contacting the metal of the container. Contact between the metal and a food or beverage, for example, can lead to corrosion of a metal container, which can then contaminate the food or beverage. This is particularly true when the contents of the can are acidic in nature. The coatings applied to the interior of metal cans also help prevent corrosion in the headspace of the cans, which is the area between the fill line of the product and the can lid; corrosion in the headspace is particularly problematic with food products having a high salt content. Coatings can also be applied to the exterior of metal cans. Certain coatings of the present invention are particularly applicable for use with coiled metal stock, such as the coiled metal stock from which the ends of cans are made ("can end stock"), and end caps and closures are made ("cap/closure stock"). Since coatings designed for use on can end stock and cap/closure stock are typically applied prior to the piece being cut and stamped out of the coiled metal stock, they are typically flexible and extensible. For example, such stock is typically coated on both sides. Thereafter, the coated metal stock is punched. For can ends, the metal is then scored for the "pop-top" opening and the pop-top ring is then attached with a pin that is separately fabricated. The end is then attached to the can body by an edge rolling process. A similar procedure is done for "easy open" can ends. For easy open can ends, a score substantially around the perimeter of the lid allows for easy opening or removing of the lid from the can, typically by means of a pull tab. For caps and closures, the cap/closure stock is typically coated, such as by roll coating, and the cap or closure stamped out of the stock; it is possible, however, to coat the cap/closure after formation. Coatings for cans subjected to relatively stringent temperature and/or pressure requirements should also be resistant to popping, corrosion, blushing and/or blistering.

Accordingly, the present invention is further directed to a package coated at least in part with any of the coating compositions described above. In some examples, the package can be a metal can. The term "metal can" includes any type of metal can, container or any type of receptacle or portion thereof used to hold something. One example of a metal can is a food can; the term "food can(s)" is used herein to refer to cans, containers or any type of receptacle or portion thereof used to hold any type of food and/or beverage. The term "metal can(s)" specifically includes food cans and also specifically includes "can ends", which are typically stamped from can end stock and used in conjunction with the packaging of beverages. The term "metal cans" also specifically includes metal caps and/or closures such as bottle caps, screw top caps and lids of any size, lug caps, and the like. Metal cans can be used to hold other items as well as food and/or beverage, including but not limited to personal care products, bug spray, spray paint, and any other compound suitable for packaging in an aerosol can. The cans can include "two-piece cans" and "three-piece cans" as well as drawn and ironed one-piece cans; such one-piece cans often find application with aerosol products. Packages coated according to the present invention can also include plastic bottles, plastic tubes, laminates and flexible packaging, such as those made from PE, PP, PET and the like. Such packaging could hold, for example, food, toothpaste, personal care products and the like.

The coating can be applied to the interior and/or the exterior of the package. For example, the coating can be rollcoated onto metal used to make a two-piece food can, a three-piece food can, can end stock and/or cap/closure stock. The present invention contemplates, the coating being applied to a coil or sheet by roll coating; the coating is then cured by radiation and can ends are stamped out and fabricated into the finished product, i.e. can ends. It is also contemplated, the coating being applied as a rim coat to the bottom of the can; such application can be by roll coating. The rim coat functions to reduce friction for improved handling during the continued fabrication and/or processing of the can. The coating of the present invention can be applied to caps and/or closures; such application can include, for example, a protective varnish that is applied before and/or after formation of the cap/closure and/or a pigmented enamel post applied to the cap, particularly those having a scored seam at the bottom of the cap. Decorated can stock can also be partially coated externally with the coating described herein, and the decorated, coated can stock used to form various metal cans.

Substrates coated according to the present invention can be coated with any of the compositions described above by any means known in the art, such as spraying, rolling, dipping, brushing, flow coating and the like; the coating may also be applied by electrocoating when the substrate is conductive. The appropriate means of application can be determined by one skilled in the art based upon the type of substrate being coated and the function for which the coating is being used. The coatings described above can be applied over the substrate as a single layer or as multiple layers with multiple heating stages between the application of each layer, if desired. After application to the substrate, the coating composition may be cured by any appropriate means.

As used herein, unless otherwise expressly specified, all numbers such as those expressing values, ranges, amounts or percentages may be read as if prefaced by the word "about", even if the term does not expressly appear. Also, any numerical range recited herein is intended to include all sub-ranges subsumed therein. Singular encompasses plural and vice versa. For example, although reference is made herein to "a" polyester-urethane resin, "an" unsaturated acid/anhydride/ester, "a" polyester prepolymer, "a" urethane segment, "a" polyol segment, "a" crosslinker, and the like, one or more of each of these and any other components can be used. As used herein, the term "polymer" refers to oligomers and both homopolymers and copolymers, and the prefix "poly" refers to two or more. Including and like terms means including but not limited to. When ranges are given, any endpoints of those ranges and/or numbers within those ranges can be combined within the scope of the present invention. The present invention is thus directed in particular, without being limited thereto, to the following aspects 1-20:

1. A curable branched polyester-urethane polymer prepared by:
   I) free radical polymerization of an ethylenically unsaturated polyester-urethane prepolymer comprising:
      i. a residual moiety of a polyol;
      ii. a residual moiety of an ethylenically unsaturated polycarboxylic acid, anhydride and/or ester; and
      iii. a residual moiety of an isocyanate-functional compound; or by
   II) free radical polymerization of a hydroxyl-functional ethylenically unsaturated polyester prepolymer comprising:
      i. a residual moiety of a polyol; and
      ii. a residual moiety of an ethylenically unsaturated polycarboxylic acid, anhydride and/or ester;
   to form a hydroxyl-functional polyester polymer, and reacting the hydroxyl-functional polyester polymer with an isocyanate-functional compound.

2. The polyester-urethane polymer according to aspect 1, wherein the ethylenically unsaturated polyester-urethane prepolymer is subjected to the free radical polymerization in the presence of a second ethylenically unsaturated prepolymer, which is a polyester prepolymer or a polyester-urethane prepolymer comprising:
   i. a residual moiety of a polyol;
   ii. a residual moiety of an ethylenically unsaturated polycarboxylic acid, anhydride and/or ester; and optionally
   iii. a residual moiety of an isocyanate-functional compound.

3. The polyester-urethane polymer according to any one of aspect 1 or aspect 2, wherein the polyol comprises neopentyl glycol and/or wherein the ethylenically unsaturated polycarboxylic acid, anhydride and/or ester comprises maleic acid, maleic anhydride and/or an ester of maleic acid.

4. The polyester-urethane polymer according to any one of the preceding aspects 1 to 3, wherein the isocyanate-functional compound comprises isophorone diisocyanate.

5. The polyester-urethane polymer according to any one of the preceding aspects 1 to 4, wherein the polyester-urethane prepolymer(s) is/are reacted with a carboxylic acid, anhydride or ester and neutralized with an amine prior to the free radical polymerization or wherein the reaction product of the hydroxyl-functional polyester polymer with an isocyanate-functional compound is reacted with a carboxylic acid, neutralized with an amine and dispersed in water.

6. The polyester-urethane polymer according to aspect 5, wherein the carboxylic acid comprises 2,2-dimethylolpropionic acid and the amine comprises triethylamine.

7. The polyester-urethane polymer according to any one of the preceding aspects 1 to 6, wherein the free radical polymerization occurs in an aqueous solution.

8. The polyester-urethane polymer according to any one of the preceding aspects 1 to 7 having a weight average molecular weight ($M_w$) of at least 15,000, such as at least 30,000, or in the range of 15,000 to 100,000, as determined by gel permeation chromatography using a polystyrene standard for calibration.

9. The polyester-urethane polymer according to any one of the preceding aspects 1 to 8, wherein the polyester-urethane prepolymer(s) has/have a weight average molecular weight ($M_w$) of 2,500 or greater as determined by gel permeation chromatography using a polystyrene standard for calibration.

10. The polyester-urethane polymer according to any one of the preceding aspects 1 to 9 not comprising a residual moiety of (meth)acrylate or (meth)acrylic acid.

11. The polyester-urethane polymer according to any one of the preceding aspects 1 to 10 having a hydroxyl value of 75 to 120 mg KOH per gram.

12. A curable coating composition, preferably a basecoat composition, comprising:
   (a) a polyester-urethane polymer according to any one of the preceding aspects 1 to 11,
   (b) a curing agent having a plurality of functional groups reactive with the polyester-urethane polymer (a).

13. A process for forming a multilayer coating on a substrate, the process comprising the steps of:
   forming a first basecoat layer over at least a portion of a substrate by applying a first basecoat composition over at least a portion of the substrate;
   optionally, drying or curing the first basecoat layer; forming a second basecoat layer on at least a portion of the first basecoat layer by applying a second basecoat composition, which is the same or different from the first basecoat composition, directly onto at least a portion of the first basecoat layer;
   optionally, drying or curing the second basecoat layer; and curing any uncured coating layer,
   wherein at least one of the first basecoat composition and the second basecoat composition comprises a curable coating composition according to claim 12.

14. The process according to aspect 13, wherein the second basecoat composition is different from the first basecoat composition and/or comprises a curable coating composition according to claim 12.

15. The process according to any one of aspects 13 or 14, further comprising forming an electrodeposition coating layer by electrodepositing an electrodepositable coating composition on at least a portion of the substrate prior to the step of forming the first basecoat layer.

16. The process according to any one of the preceding aspects 13 to 15, further comprising forming a clearcoat layer over at least a portion of the second basecoat layer by depositing a clearcoat composition over at least a portion of the second basecoat layer.

17. A substrate coated at least in part with a coating comprising at least one coating layer obtained by:
    (a) applying a curable coating composition according to aspect 12 over at least a portion of a surface of the substrate, and
    (b) at least partially curing the applied curable coating composition.

18. The coated substrate according to aspect 17, wherein the coating has a chip resistance lower than 2 as measured with an Erichsen stone hammer blow testing instrument model 508 operated at 2 bar and 25° C.

19. The coated substrate according to any one of aspect 17 or aspect 18 being a substrate coated with a multilayer coating formed according to the process according to any one of aspects 13 to 16.

20. The coated substrate according to any one of aspects 17 to 19, wherein the substrate is a part of a vehicle.

EXAMPLES

The following examples are intended to illustrate the invention and should not be construed as limiting the invention in any way.

Preparation of Unsaturated Polyester Prepolymer

An unsaturated polyester prepolymer was prepared from the following ingredients as described below: A total of 3327.5 grams of neopentyl glycol, 3350.9 grams of adipic acid, 321.5 grams of maleic anhydride and 0.203 grams of butylstannoic acid were added to a suitable reaction vessel equipped with a stirrer, temperature probe, and glycol recovery setup (a packed column with an empty column on top and a distillation head connected to a water cooled condenser) and a nitrogen sparge. The contents of the flask were heated to 215° C. with continuous removal of water distillate beginning at about 140° C. The temperature of the contents were held to 215° C. until about 892 grams of water had been distilled and the acid value of the reaction mixture was found to be 1.86 mg KOH/g. The contents of the reactor were cooled to 160° C. before thinning to 75% theory solids with 2040 grams of PROGLYDE DMM. The reaction product has a measured solid of 73.7%, a hydroxyl value of 72.8 mg KOH/g and a weight average molecular weight of 3434 as measured against a polystyrene standard.

Preparation of Uncured Branched Polyester-Urethane Resins

Example 1

A total of 1316.9 grams of the unsaturated polyester prepolymer prepared as described above and 187.1 grams of PROGLYDE DDM were placed in a suitable reaction vessel equipped with a stirrer, temperature probe, reflux condenser and a nitrogen blanket. The contents of the flask were mixed and heated to 45° C. and 231.7 grams of isophorone diisocyanate was added dropwise from an addition funnel to the reaction contents over a period of 30 minutes, followed by a funnel rinse of 20.4 grams of PROGLYDE DMM. After about 98 minutes, the contents of the flask were heated to 55° C. The isocyanate (NCO) equivalent weight was checked by titration every 30 minutes until the NCO value reached about 1655. A total of 69.7 grams of 2,2-dimethylolpropionic acid was added to the flask followed by 42.1 grams of trimethylamine and a rinse of 10.2 grams of PROGLYDE DMM. The contents of the flask were heated to 80° C. until the isocyanate peak at about 2265 $cm^{-1}$ in the fourier transform infrared spectroscopy (FTIR) spectrum had disappeared. A total of 19.8 grams of trimellitic anhydride was added to the flask via a powder funnel. The contents of the flask were held at 80° C. until the anhydride peak at about 1790 $cm^{-1}$ in the FTIR spectrum had disappeared. The milliequivalents (meq) of base was measured to be 0.186. 24.0 grams of triethylamine was added to the flask to bring the theoretical % total neutralization to about 80%. The triethylamine was rinsed with 6.1 grams of PROGLYDE DMM. After stirring for about 15 minutes, 1747.8 grams of deionized water was added to the reaction contents over a period of 30 minutes. The contents of the flask were heated to 80° C. over a period of 30 minutes. Once the contents reached a temperature of 80° C., a mixture of 20.5 grams of LUPEROX® 26 (available from Arkema) and 10.3 grams of PROGLYDE DMM were added to the flask over a period of about 1 minute, followed by 10.2 grams of PROGLYDE DMM rinse. The contents of the flask were held for 1 hour at 80° C., then cooled to 45° C. At 45° C., 17.7 grams of deionized water were added to the flask. The reactor contents were poured out after stirring for 3 minutes. The final resin had a measured solids of 35.4%, a Brookfield viscosity (#1 spindle, 50rpm, 25° C.) of about 103 cp and a weight average molecular weight of 37334 as measured against a polystyrene standard. This polyurethane dispersion has a theoretical hydroxyl value on solid resin of 24.9 mg KOH/gram of sample.

Example 2

A total of 1316.9 grams of the unsaturated polyester prepolymer prepared as described above and 187.1 grams of PROGLYDE DDM were placed in a suitable reaction vessel equipped with a stirrer, temperature probe, reflux condenser and a nitrogen blanket. The contents of the flask were heated to 45° C. and 247.5 grams of isophorone diisocyanate was added from an addition funnel over 30 minutes, followed by a funnel rinse of 20.4 grams of PROGLYDE™ DMM. After about 70 minutes, the flask was warmed to 55° C. The isocyanate (NCO) equivalent weight was checked by titration every 30-60 minutes until it reached about 1574. Then 69.3 grams of 2,2-dimethylolpropionic acid was added to the flask, followed by 41.9 grams of triethylamine and a rinse with 10.1 grams of PROGLYDE™ DMM. The contents of the flask were heated to 80° C. until the isocyanate peak at about 2265 $cm^{-1}$ in the FTIR spectrum had disappeared. Then, 19.7 grams of trimellitic anhydride was added to the flask via a powder funnel. The contents of the flask were held at 80° C. until the anhydride peak at about 1790$cm^{-1}$ in the FTIR spectrum had disappeared. The milliequivalents (meq) of base was measured to be 0.212. 18.6 grams of triethylamine was added to bring the theoretical % total neutralization to about 80%. The triethylamine was rinsed with 6.0 grams of PROGLYDE™ DMM. After stirring for about 15 minutes, 1771.8 grams of deionized water was added over 30 minutes. The contents of the flask were heated to 80° C. over a period of 30 minutes. Once the contents reached a temperature of 80° C., a mixture of 20.4 grams of LUPEROX® 26 (available from Arkema) and 10.2 grams of PROGLYDE™ DMM were added to the flask over a period of about 1 minute, followed by a rinse with 10.2 grams of PROGLYDE™ DMM. The contents of the flask were held at 80° C. for 1 hour, then cooled to 45° C. At 45° C., 17.6 grams of deionized water were added. The reactor contents were poured out after stirring for several minutes. The final polyurethane dispersion had a measured percent solids (110° C./1 hour) of about 35.7%, an meq acid of 0.203, an meq base of 0.149, a pH of 7.23 and a Brookfield viscosity (#1 spindle, 50rpm, 25° C.) of about 423 cp. This polyurethane dispersion has a theoretical hydroxyl value on solid resin of 18.6 mgKOH/gram of sample.

Example 3

A total of 1316.9 grams of the unsaturated polyester prepolymer prepared as described above and 187.1 grams of PROGLYDE DDM were placed in a suitable reaction vessel equipped with a stirrer, temperature probe, reflux condenser and a nitrogen blanket. The contents of the flask were heated to 45° C. and 247.5 grams of isophorone diisocyanate was added from an addition funnel over 30 minutes, followed by a funnel rinse of 20.4 grams of PROGLYDE™ DMM. The flask was then warmed to 55° C. The isocyanate (NCO) equivalent weight was checked by titration every 30 minutes until it reached about 1505. Then 69.5 grams of 2,2-dimethylolpropionic acid was added to the flask, followed by 42.0 grams of triethylamine and a rinse with 10.1 grams of PROGLYDE™ DMM. The contents of the flask were heated to 80° C. until the isocyanate peak at about 2265 cm$^{-1}$ in the FTIR spectrum had disappeared. Then, 19.8 grams of trimellitic anhydride was added to the flask via a powder funnel. The contents of the flask were held at 80° C. until the anhydride peak at about 1790 cm$^{-1}$ in the FTIR spectrum had disappeared. The milliequivalents (meq) of base was measured to be 0.207. 19.8 grams of triethylamine was added to bring the theoretical % total neutralization to about 80%. The triethylamine was rinsed with 6.1 grams of PROGLYDE™ DMM. After stirring for about 15 minutes, 1806.3 grams of deionized water was added over 30 minutes. The contents of the flask were heated to 80° C. over a period of 30 minutes. Once the contents reached a temperature of 80° C., a mixture of 20.5 grams of LUPEROX® 26 (available from Arkema) and 10.2 grams of PROGLYDE™ DMM were added to the flask over a period of about 1 minute, followed by a rinse with 10.2 grams of PRO-GLYDE™ DMM. The contents of the flask were held at 80° C. for a period of about 1 hour. After about half of this 1 hour hold 538 grams of deionized water were slowly added to the flask. After completion of the 1 hour hold the contents of the flasks was allowed to cool to 45° C. At 45° C., 17.6 grams of deionized water were added. The reactor contents were poured out after stirring for several minutes. The final polyurethane dispersion had a measured percent solids (110° C./1 hour) of about 31.3%, an meq acid of 0.174, an meq base of 0.127, a pH of 7.26 and a Brookfield viscosity (#1 spindle, 50 rpm, 25° C.) of about 306 cp. This polyurethane dispersion has a theoretical hydroxyl value on solid resin of 12.4 mgKOH/gram of sample.

Coating Compositions Comprising Uncured Branched Polyester-Urethane Resin

Table 1 lists the ingredients used to make five pigmented basecoat samples (Sample 3, 4, and 5) using the uncured branched polyester-urethane resin of the present invention (the polyester-urethane resin of Example 1) and two comparative pigmented basecoat samples (Sample 1 and 2):

Comparative Sample 1 uses neither a commercially available polyurethane resin nor polyester-urethane resin of the present invention. Comparative Sample 2 uses a commercially available polyurethane resin. Samples 3, 4 and 5 use the polyester-urethane resin of the present invention.

TABLE 1

| Component | Sample 1 | Sample 2 | Sample 3 | Sample 4 | Sample 5 |
|---|---|---|---|---|---|
| Polyester-urethane Resin of Example 1[1] | 0 | 0 | 23.60 | 47.30 | 11.80 |
| Polyurethane Resin[2] | 0 | 24.00 | 0 | 0 | 0 |
| Polyurethane acrylic latex[3] | 24.15 | 24.15 | 24.15 | 24.15 | 24.15 |
| Acrylic dispersion[4] | 13.05 | 13.05 | 13.05 | 13.05 | 13.05 |
| Polyester resin[5] | 16.40 | 16.40 | 16.40 | 16.40 | 16.40 |
| Deionized Water | 79.50 | 79.50 | 79.50 | 79.50 | 79.50 |
| Dimethyl ethanolamine (50% aqueous solution)[6] | 1.55 | 1.55 | 1.55 | 1.55 | 1.55 |
| Phosphatized epoxy[7] | 0.60 | 0.60 | 0.60 | 0.60 | 0.60 |
| Byk 348 surfactant[8] | 0.50 | 0.50 | 0.50 | 0.50 | 0.50 |
| P-1000E[9] | 10.50 | 10.50 | 10.50 | 10.50 | 10.50 |
| Resimene HM2608[10] | 41.15 | 41.15 | 41.15 | 41.15 | 41.15 |
| 2-butoxyethanol[11] | 5.00 | 5.00 | 5.00 | 5.00 | 5.00 |
| Hexyl cellosolve[12] | 24.35 | 24.35 | 24.35 | 24.35 | 24.35 |
| Shellsol D 70[13] | 18.80 | 18.80 | 18.80 | 18.80 | 18.80 |
| Surfynol 104E[14] | 4.80 | 4.80 | 4.80 | 4.80 | 4.80 |
| White tint paste[15] | 5.20 | 5.20 | 5.20 | 5.20 | 5.20 |
| Red tint paste[16] | 180.05 | 180.05 | 180.05 | 180.05 | 180.05 |
| Violet tint paste[17] | 4.65 | 4.65 | 4.65 | 4.65 | 4.65 |
| Black tint paste[18] | 1.85 | 1.85 | 1.85 | 1.85 | 1.85 |
| Hydrophobic Amorphous SiO$_2$ dispersion[19] | 24.00 | 24.00 | 24.00 | 24.00 | 24.00 |
| Total | 456.10 | 480.10 | 479.70 | 503.40 | 467.90 |

[1]Polyester-urethane Resin of Example 1:
[2]Polyurethane Resin Witco Bond 272 available from Chemtura Corp.
[3]Polyurethane acrylic latex - Polymer of Example IIA described in U.S. Pat. No. 5,972,809.
[4]Acrylic dispersion made of 30.0 wt % Styrene, 35.0 wt % n-Butyl Acrylate, 18.0 wt % n-Butyl Methacrylate, 8.5 wt % 2-Hydroxyethyl Acrylate and 8.5 wt % Acrylic Acid made at 26.1% weight solids in a 84.5 wt % deionized water/15.5 wt % Butyl Carbitol solvent mixture and 54% neutralized with Dimethyl Ethanolamine.
[5]Polyester resin - Polymer of Example 2 described in U.S. Pat. No. 5,468,802.
[6]Dimethyl ethanolamine (50% aqueous solution)
[7]Phosphatized Epoxy prepared from Epon 828, polyglycidyl ether of Bisphenol A, avaialable from Shell Chemical Co; reacted with phosphoric acid at an 83:18 weight ratio.
[8]Additive available from Byk Chemie.
[9]Polyether polyol available from Bayer Material Science.
[10]Melamine curing agent commercially available from INEOS Melamine.
[11,12]Solvents available from Dow Co.
[13]Solvent available from Shell Chemical Co.
[14]Surfactant available from Air Products & Chemicals.
[15]White tint paste having 50% TiO2 and having a solids content of 62%.
[16]Red tint paste having 34% ferric iron oxide and having a solids content of 46%.
[17]Violet tint paste having 12% Hostaperm Violet RL Special commercially available from Clariant Pigments and having a solids content of 25%.
[18]Black tint paste having 5% Monarch 120 and having a solids content of 24%.
[19]Dispersion of 9% Aerosil R812 commercially available from Evonik Degussa in 21% acrylic polymer blend and having a solids content of 31%.

The basecoats were spray applied in an environment controlled to 70-75° F. (21-24° C.) and 50-60% relative humidity using a LabPainter machine made by LacTec Gmbh, onto 12 inch by 20 inch steel panels coated with cured ELECTROCOAT (ED 6060CZ) and Primer (A-F106820-4P5) available from PPG Industries, Italy. For chip resistance and adhesion tests, the basecoats were spray applied to the panels and flashed at ambient temperature for a period of 5 minutes and then baked at 80° C. for a period of 10 minutes. A clearcoat (A-F105359-4C0) available from PPG Industries, Italy, was spray applied onto the basecoat and flashed at ambient temperature for a period of 10 minutes. The entire layering system was baked at 140° C. for a period of 30 minutes. The dry film thickness for the basecoat and clearcoat was 0.7-0.8 mils and 1.6-2.3 mils, respectively.

For sag resistance, 12 inch by 20 inch steel panels coated with cured ELECTROCOAT (ED 6060CZ) and Primer (A-F106820-4P5) available from PPG Industries, Italy, was sprayed with basecoats compositions of Samples 1-5. Holes (10 millimeter diameter each) were punched equidistance apart down the length of each steel test panel. For application of each basecoat composition, a test panel was positioned vertically with the holes running from left to right. Each of the respective basecoat compositions of Samples 1-5 were spray applied to the test panel using automated spray equipment in an environment controlled to 70-75° F. (21-24° C.) and 50-60% relative humidity using the composition in each pass to create a film thickness wedge (i.e., film thickness increasing from left to right of the test panel), also known as "wedge panels". Each of the coated test panels was then allowed to "flash" at ambient temperature for a period of 5 minutes and then baked at 80° C. for a period of 10 minutes. A clearcoat (A-F105359-4C0) available from PPG Industries, Italy, was spray applied onto the basecoat and flashed at ambient temperature for a period of 10 minutes. The entire layering system was baked at 140° C. for a period of 30 minutes. The test panels were left hanging vertically until fully cured. Sag resistance was measured by recording the length (millimeters) of the "sag", i.e., the coating that ran from the bottom of the hole at a given dry film thickness. For purposes of the present invention, acceptable coating sag was measured once the coating sag hit a tolerance limit of less than 3 mm from the bottom of the hole at a given dry film thickness. In the present invention, the dry film thickness for the basecoat was 0.2 to 1.4 mils and the clearcoat had a dry film thickness of 1.6 to 2.3 mils (as measured from left to right on the steel panel). The sag resistance test results are set forth in Table 2 below with higher values indicating better sag resistance.

Table 2 provides a summary of the performance and physical properties obtained for each of the above samples.

TABLE 2

| SAMPLE | Coating Adhesion Test[11] | Windshield Adhesion[12] | Chip Resistance[13] | Sag Resistance[14] |
|---|---|---|---|---|
| 1 | 20% | 20% | 2.5 | 25μ |
| 2 | 40% | 50% | 2 | 15μ |
| 3 | 100% | 100% | 1.5 | 20μ |
| 4 | 100% | 100% | 1.5 | 20μ |
| 5 | 80% | 100% | 1.5 | 20μ |

[11]Coating adhesion testing was performed with a Walter Cleaning Systems steam jet test equipment model LTA1-H-A-T80-LP-PA and having a ¼ HP nozzle (PMEG-2506) as follows: a test panel was prepared as described above for each Samples 1-5. Several cuts were applied to the coated test panels in a cross pattern. A steam jet of high-pressure water was directed to the scribed test panels at a temperature of 60° C., a pressure of 70 bar, a distance of 10 cm from nozzle to test panel, an angle of 90° relative to the test panel and at a duration of 1 minute to stress the coating. The paint adhesion was visually inspection and measured by the Volkswagen (VW) test method PV1503B. The higher percentage values indicating better paint adhesion.
[12]Windshield adhesion testing was performed and measured as follows: a bead of windshield adhesive is applied to the clearcoat surface within 1-4 hours following the final bake (30 minutes at 140° C.). Sikaflex windshield adhesive (250HMV-2+) obtained from Silka Schweiz AG was used. Approximately a 20 mm x 200 mm x 50 mm adhesive bead is placed on the cured color plus clear substrate. The adhesive is cured for 10 days under 100% humidity at a temperature of 40° C. After the 10 day cure period, the adhesive bead is cut with a razor blade while pulling back the edge of the adhesive at a 180° angle. A minimum of 10 cuts is done for each system. Any delamination of the multi-coating layer was visually inspected and measured. A result of 90-100% of the coating remaining attached to the substrate is considered "acceptable" or "pass" in the automotive industry. When 0%-10% of the coating delaminates from the substrate this is considered a "fail".
[13]Chip Resistance testing was performed with the Stone Hammer Blow Testing Instrument Model 508 manufactured by ERICHSEN GMBH & CO KG as follows: Each coated test panel was struck twice with 500 grams of fractured steel shot 4-5 mm in size and at a pressure 200 Kpa. The Stone Hammer Blow test determines a multi-coating systems' ability to withstand impacts caused by small objects hitting a test substrate at high speeds similar to rocks hitting an automobile body at high speeds. A visual rating scale from DIN EN ISO 20567-1 was used to rate the panels. The rating scale is from 0.5 to 5 with lower values indicating better resistance to chipping.
[14]Sag resistance was measured by visual inspection and recording the length (millimeters) of the sag with higher values indicating better sag resistance.

The results shown in Table 2 above, demonstrate that basecoats having adequate intercoat adhesion, chip resistance and sag resistance properties can be prepared according to the present invention.

Whereas particular examples of this invention have been described above for purposes of illustration, it will be evident to those skilled in the art that numerous variations of the details of the present invention may be made without departing from the scope of the invention as defined in the appended claims.

What is claimed is:
1. A coating composition comprising:
   i) a polyester-urethane resin and
   ii) a crosslinker; wherein the polyester-urethane resin i) comprises an uncured, branched polyester-urethane resin prepared by free radical polymerization of double bonds in an unsaturated polyester-urethane prepolymer, wherein the unsaturated polyester-urethane prepolymer is prepared by reacting:
   a) one or more polyols;
   b) one or more unsaturated polycarboxylic acids and/or anhydrides and/or esters thereof; and
   c) one or more isocyanates; wherein the branched polyester-urethane resin is not prepared from unsaturated monomers other than the unsaturated polycarboxylic acids and/or anhydrides and/or esters thereof of b), and wherein the branched polyester-urethane resin is not a graft copolymer; and wherein the crosslinker ii) is selected from phenolic resins, amino resins, epoxy resins, isocyanate resins, beta-hydroxy (alkyl) amide resins, alkylated carbamate resins, polyacids, anhydrides, organometallic acid-functional materials, polyamines, polyamides, aminoplasts and mixtures thereof.

2. The coating composition of claim 1, wherein the one or more unsaturated polycarboxylic acids and/or anhydrides and/or esters thereof is selected from adipic acid, azelaic acid, sebacic acid, succinic acid, glutaric acid, decanoic diacid, dodecanoic diacid and esters and anhydrides thereof.

3. The coating composition of claim 1, wherein the one or more unsaturated polycarboxylic acids and/or anhydrides and/or esters thereof is selected from phthalic acid, isophthalic acid, 5-tert-butylisophthalic acid, tetrachlorophthalic acid, tetrahydrophthalic acid, naphthalene polycarboxylic acid, terephthalic acid, hexahydrophthalic acid, methylhexahydrophthalic acid, dimethyl terephthalate, cyclohexane dicarboxylic acid, chlorendic anhydride, 1,3-cyclohexane dicarboxylic acid, 1,4-cyclohexane dicarboxylic acid, tricyclodecane polycarboxylic acid, endomethylene tetrahydrophthalic acid, endoethylene hexahydrophthalic acid, cyclohexane tetracarboxylic acid, cyclobutane tetracarboxylic acid and esters and anhydrides thereof and combinations thereof.

4. The coating composition of claim 1, wherein the crosslinker ii) comprises an alkylated phenol/formaldehyde resin with a functionality ≥3 and difunctional o-cresol/formaldehyde resins.

5. The coating composition of claim 1, wherein the crosslinker ii) comprises hexamethylene diisocyanate, isophorone diisocyanate, toluene diisocyanate, 4,4'-diphenylmethane diisocyanate, an isocyanurate trimer, an allophanate, and/or a uretdione of a diisocyanate or polycarbodiimide.

6. The coating composition of claim 1, wherein the coating composition is water-based.

7. The coating composition of claim 1, wherein the coating composition is solvent-based.

8. The coating composition of claim 1, further comprising iii) a film-forming polymer having functional groups that are reactive with either themselves or the crosslinker ii).

9. The coating composition of claim 8, wherein the additional film-forming polymer iii) is selected from acrylic polymers, polyester polymers, polyurethane polymers, polyamide polymers, polyether polymers, polysiloxane polymers, copolymers thereof, and mixtures thereof.

10. The coating composition of claim 1, wherein the one or more polyols a) comprises neopentyl glycol, and the unsaturated polycarboxylic acid, anhydride and/or ester b) comprises maleic acid, maleic anhydride and/or an ester of maleic acid.

* * * * *